United States Patent
Campbell et al.

(10) Patent No.: US 10,084,399 B2
(45) Date of Patent: Sep. 25, 2018

(54) DETECTING POSITION MEASUREMENT ERRORS IN AN ELECTRIC MOTOR SYSTEM

(71) Applicant: Faraday & Future Inc., Gardena, CA (US)

(72) Inventors: Mengwei Li Campbell, Torrance, CA (US); Stefan Grubic, Hermosa Beach, CA (US)

(73) Assignee: FARADAY & FUTURE INC., Gardena, CA (US)

(*) Notice: Subject to any disclaimer, the term of this patent is extended or adjusted under 35 U.S.C. 154(b) by 0 days.

(21) Appl. No.: 15/630,829

(22) Filed: Jun. 22, 2017

(65) Prior Publication Data

US 2018/0138841 A1    May 17, 2018

Related U.S. Application Data (60) Provisional application No. 62/353,450, filed on Jun. 22, 2016.

(51) Int. Cl.
*H02P 1/04* (2006.01)
*H02P 6/15* (2016.01)
*H02P 6/18* (2016.01)
*H02P 21/24* (2016.01)

(52) U.S. Cl.
CPC ............. *H02P 6/157* (2016.02); *H02P 6/183* (2013.01); *H02P 21/24* (2016.02)

(58) Field of Classification Search
CPC .. H02P 21/18; H02P 6/18; H02P 6/183; H02P 21/24; H02P 2203/11
See application file for complete search history.

(56) References Cited

U.S. PATENT DOCUMENTS

| | | | | |
|---|---|---|---|---|
| 9,948,224 | B1* | 4/2018 | Huh | H02P 21/24 |
| 2006/0119305 | A1* | 6/2006 | Lee | H02P 1/163 |
| | | | | 318/400.34 |
| 2008/0197799 | A1* | 8/2008 | Tomigashi | H02P 6/18 |
| | | | | 318/768 |
| 2008/0309265 | A1* | 12/2008 | Terada | H02P 21/06 |
| | | | | 318/400.02 |
| 2010/0264861 | A1* | 10/2010 | Basic | H02P 21/32 |
| | | | | 318/400.02 |
| 2010/0286948 | A1* | 11/2010 | Terada | H02P 21/0035 |
| | | | | 702/150 |
| 2010/0301790 | A1* | 12/2010 | Liu | H02P 6/18 |
| | | | | 318/400.33 |
| 2013/0320897 | A1* | 12/2013 | Hirono | H02P 6/182 |
| | | | | 318/400.34 |

(Continued)

*Primary Examiner* — Shawki S Ismail
*Assistant Examiner* — Zoheb Imtiaz
(74) *Attorney, Agent, or Firm* — Skyler R. Lund (57) ABSTRACT

A system for controlling an electric motor is disclosed. The system includes a position sensor configured to measure a physical position of a rotor of the electric motor; and a position estimator. The position estimator is configured to: inject a voltage signal having a predetermined frequency into the electric motor, generate an estimated position of a rotor flux based on a feedback current signal in response to the injected voltage signal, and compensate for an offset between the physical position measured by the position sensor and an actual position of the rotor flux based on the estimated position.

20 Claims, 9 Drawing Sheets

(56) References Cited

U.S. PATENT DOCUMENTS

| | | | | |
|---|---|---|---|---|
| 2014/0145654 A1* | 5/2014 | Zhang | ................... | H02P 21/14 |
| | | | | 318/400.02 |
| 2014/0346984 A1* | 11/2014 | Shiota | ................... | H02P 6/183 |
| | | | | 318/400.02 |
| 2018/0076748 A1* | 3/2018 | Yamasaki | ............... | H02P 21/14 |

* cited by examiner

DETECTING POSITION MEASUREMENT ERRORS IN AN ELECTRIC MOTOR SYSTEM

CROSS-REFERENCE TO RELATED APPLICATIONS

This application claims the benefit of U.S. Provisional Application No. 62/353,450, filed Jun. 22, 2016, the entirety of which is hereby incorporated by reference.

TECHNICAL FIELD

This disclosure relates generally to control of electric or electrical motors, and more particularly, to systems and methods for detecting position measurement errors of an electric motor system.

BACKGROUND

Closed loop control is commonly used to regulate motor torques of high performance AC motors, such as interior permanent magnet (IPM) motors or other types of synchronous electric motors. In a typical closed loop control system, accurate information of the rotational position of a rotor of the motor is required to effectively drive the motor. The position of the rotor is typically measured using a position sensor. For example, a resolver may measure the position of the motor rotor by measuring a position of a resolver rotor that is co-axial and co-rotating with the motor rotor. However, due to factors such as manufacture variations and tolerances, the relative position between the resolver (e.g., the resolver rotor) and the motor rotor is subject to errors, resulting in position measurement errors. The position measurement errors may cause inefficiencies in control and energy consumption, instability in motor operation, or other adverse effects. For example, when an IPM motor supplies motive torque in a vehicle propulsion system, the position measurement errors may cause reduced driving range, reduced torque, and increased noise and vibration.

The present disclosure is directed to overcoming or mitigating the adverse effects caused by position measurement errors.

DETAILED DESCRIPTION

Figure 1:
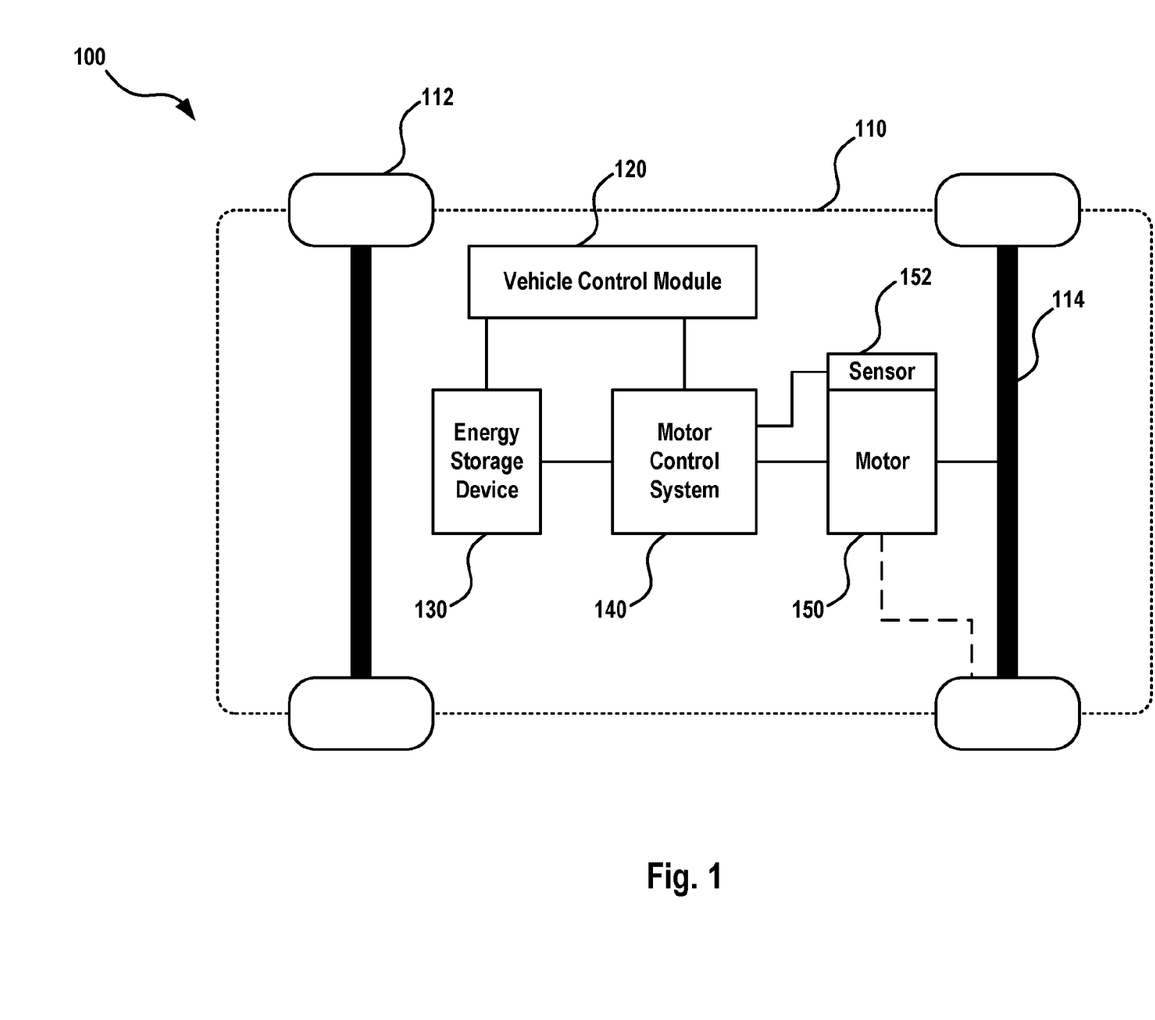
FIG. 1 is a block diagram of an exemplary embodiment of a vehicle equipped with an electric motor propulsion system.

FIG. 1 is a block diagram of an exemplary embodiment of a vehicle 100, according to one aspect of the disclosure. As shown in FIG. 1, vehicle 100 may include a chassis 110 and a plurality of wheels 112. Chassis 110 may be mechanically coupled to wheels 112 by, for example, a suspension system. Vehicle 100 may also include an electric or electrical motor propulsion system. For example, vehicle 100 may include one or more electric motors, such as motor 150, to supply motive torque. Wheels 112 may be coupled to motor 150 in various ways. In one embodiment, as illustrated in FIG. 1, opposite wheels may be connected through a shaft 114, which may be mechanically coupled to motor 150 to transmit torque and rotation from motor 150 to the connecting wheels. In another embodiment, motor 150 may drive individual wheels directly, as illustrated, in a simplified manner, by a dashed line from motor 150 to the lower right wheel. For example, motor 150 may be located close to a wheel to provide driving power directly to the wheel. In this case, multiple motors may be used and each wheel may be driven by a separate motor or a group of motors. In another example, motor 150 may be built into a wheel such that the wheel may rotate co-axially with a rotor of the motor.

Motor 150 may be an AC synchronous electric motor including a rotor and a stator (not shown). The stator may include a plurality of poles, with each pole including windings connected to an AC power source, such as a three-phase AC power source. During operation, the AC powered stator may generate a rotating magnetic field to drive the rotor to rotate. The rotor may include windings and/or permanent magnet(s) to form a magnet such that the north/south pole of the magnet is continuously attracted by the south/north pole of the rotating magnetic field generated by the stator, thereby rotating synchronously with the rotating magnetic field. Exemplary AC synchronous electric motors include interior permanent magnet (IPM) motors, reluctance motors, and hysteresis motors. In some embodiments, the control system and method disclosed herein may also be used to control other types of motors.

Motor 150 may be controlled by a motor control system 140. Motor control system 140 may regulate energy transfer from an energy storage device 130 to motor 150 to drive motor 150. In some embodiments, motor 150 may operate in a generator mode, such as when vehicle 100 undergoes speed reduction or braking actions. In the generator mode, the excess motion energy may be used to drive motor 150 to generate electrical energy and feed the energy back to energy storage device 130 through motor control system 140. In some embodiments, energy storage device 130 may include one or more batteries to supply DC power. Motor control system 140 may include a DC-AC inverter to convert the DC power supplied by energy storage device 130 into AC driving power to drive motor 150. For example, the DC-AC inverter may include power electronic devices operating under a pulse-width modulation (PWM) scheme to convert the DC power into AC power.

Vehicle 100 may include a vehicle control module 120 to provide overall control of vehicle 100. For example, vehicle control module 120 may act as an interface between user operation and propulsion system reaction. For example, when a driver depresses an acceleration pedal of vehicle 100, vehicle control module 120 may translate the acceleration operation into a torque value to be output by motor 150, a target rotation speed of motor 150, or other similar parameters to be executed by the propulsion system. Vehicle control module 120 may be communicatively connected to motor control system 140 to supply commands and/or receive feedback. Vehicle control module 120 may also be communicatively connected to energy storage device to monitor operation status such as energy level, temperature, recharge count, etc.

A sensor 152 may detect the position of the rotor of motor 150. For example, sensor 152 may be a resolver assembly including a resolver stator and a resolver rotor. The resolver rotor may be affixed to the motor rotor concentrically or coaxially such that both the resolver rotor and the motor rotor rotate synchronously. The resolver rotor may include a plurality of lobes having eccentricities such that, when rotating, the position of the resolver rotor may be determined by detecting the proximity of the lobed resolver rotor to the resolver stator. The position of the motor rotor may then be determined based on the position of the resolver rotor. Motor control system 140 may receive the positional information as feedback data to determine the proper power application scheme (e.g., PWM switching timing).

For synchronous electric motors such as IPM motors, accurate motor rotor position information may be important to regulate power application. However, due to factors such as manufacture variations and tolerance, the relative position between resolver rotor and motor rotor is subject to error. For example, the error may be due to misalignment between the resolver rotor and the motor rotor. The actual position of the motor rotor, normally the position of the rotor flux used in motor control, may be represented by a direct-quadrature (d-q) coordinate in a reference frame. Similarly, the position of the resolver rotor, which is also the measured position of the motor rotor, can be represented by another d-q coordinate in the reference frame. In the reference frame (e.g., the d-q reference frame), the field flux linkage component (along the d axis) and the torque component (along the q axis) of a three-phase AC signal are decoupled to orthogonal directions d and q. Therefore, the misalignment may be quantified by an angular offset $\Delta\theta$ between the d axis of the motor rotor and the d axis of the resolver rotor.

Figure 2A:
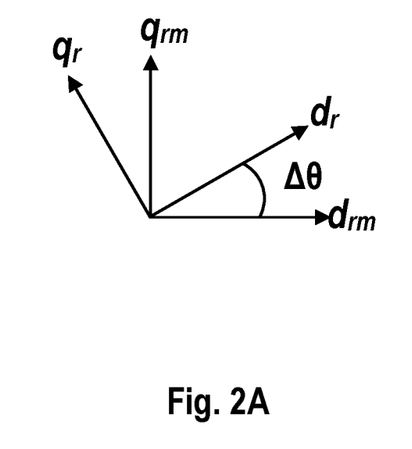
FIG. 2A is a graphical representation of an exemplary offset between an actual rotor position and a measured rotor position in a reference frame.

FIG. 2A is a graphical representation of an exemplary offset $\Delta\theta$ between an actual motor rotor position (indicated by the d axis) and a measured motor rotor position (indicated by the $d_m$ axis) in a d-q reference frame.

Figure 3:
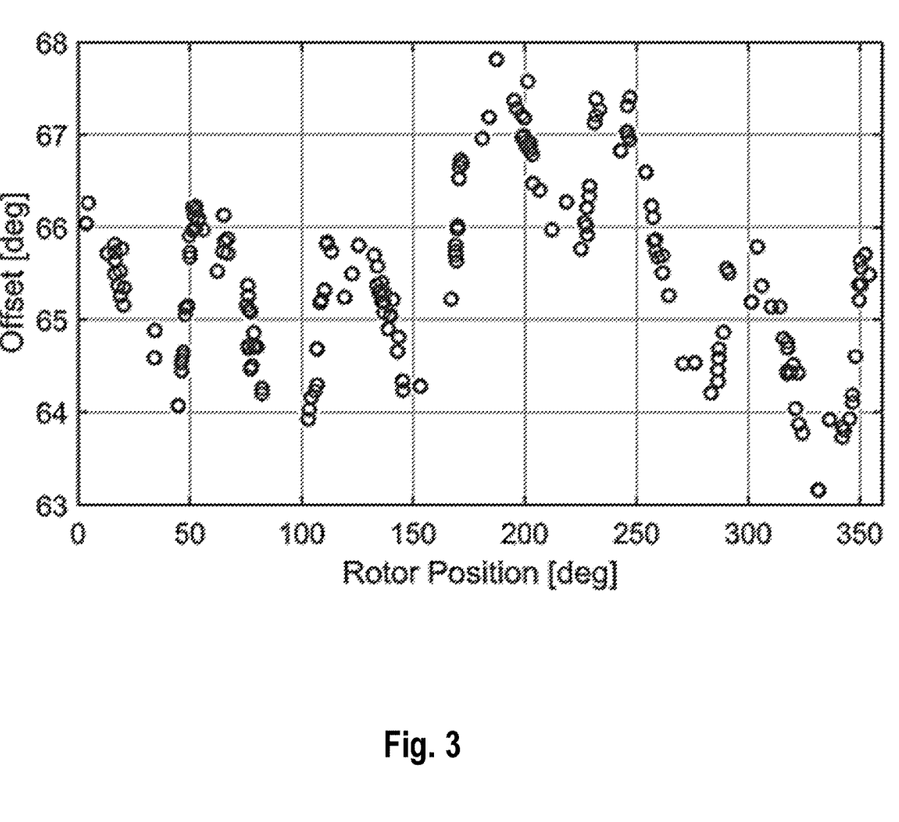
FIG. 3 is a diagram that illustrates a mapping between an estimated offset and a rotor position of an exemplary embodiment of a motor control system.
Figure 4:
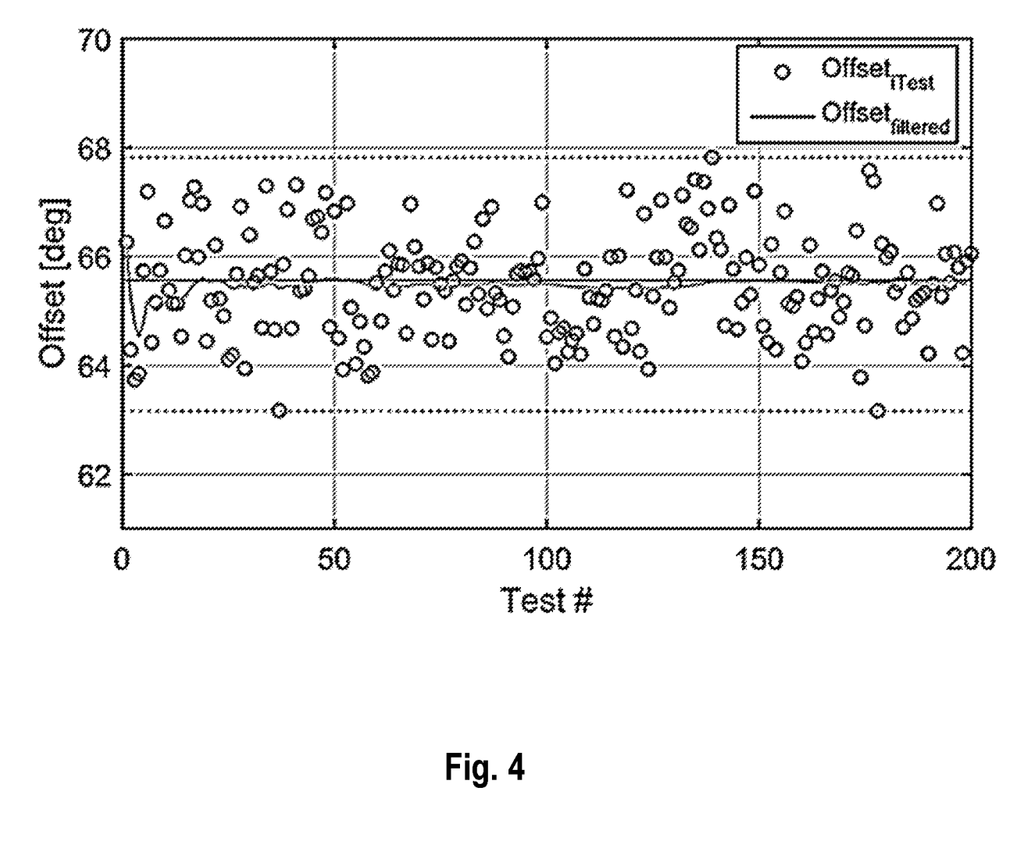
FIG. 4 is a diagram that illustrates a distribution of an estimated offset over a plurality of estimation iterations of an exemplary embodiment of a motor control system.

The angular offset $\Delta\theta$ of a synchronous motor (e.g., an IPM motor) may vary based on the rotor position. FIG. 3 illustrates exemplary rotor position dependence of angular offset $\Delta\theta$. As shown in FIG. 3, angular offset $\Delta\theta$ may vary between about 63 to 68 degrees at different rotor positions (e.g., from 0 to 360 degrees). The actual angular offset of the synchronous motor $\Delta\theta$ can be estimated based on a plurality of samples of angular offsets collected over a range of rotor positions. For example, if the collected samples of angular offsets correspond to a set of substantially uniformly-distributed rotor positions, the actual angular offset can be estimated based on, for example, an average of the samples. For example, FIG. 4 illustrates that multiple sets of offset samples (e.g., each set is collected in one test) which give a distribution of offset samples. In one example, when these offset samples are averaged, they may converge to a value around 65.5 degrees, which agrees closely with a value found using a manual calibration process.

Embodiments disclosed in this application provide a convenient solution to detect and compensate for the offset $\Delta\theta$. For example, a position estimator may be provided to estimate the position of the rotor, and the estimated rotor position, denoted by $\hat{\theta}_r$, can be used to control motor operation such as reference frame transformations. If the estimated rotor position $\hat{\theta}_r$ is the same as the actual rotor position $\theta_r$, then the estimated rotor reference frame used in the control algorithm also aligns perfectly with the actual rotor reference frame. Under this condition, injecting a voltage signal (e.g., a pulsating, sinusoidal high frequency voltage signal) into the d-axis of the estimated (also the actual) rotor reference frame would result in zero q-axis current in response when the motor operates in low speed or in a stalled position. However, if the estimated rotor position $\hat{\theta}_r$ is different from the actual rotor position $\theta_r$, for example having a difference $\Delta\theta_r$, then injecting a voltage signal into the d-axis of the estimated rotor reference frame would result in non-zero q-axis current in response to the injection. The non-zero q-axis current response may carry information of the difference $\Delta\theta_r$ and can be demodulated to extract the information of the difference $\Delta\theta_r$. A observer can be used to drive the difference $\Delta\theta_r$ to zero by adjusting the estimated rotor position $\hat{\theta}_r$. Once the difference $\Delta\theta_r$ converges or is driven to a sufficiently small value, the output of the position estimator may be deemed the same as or very close to the actual rotor position. The offset between the actual rotor position and the measured rotor position $\Delta\theta$ can also be determined.

Figure 2B:
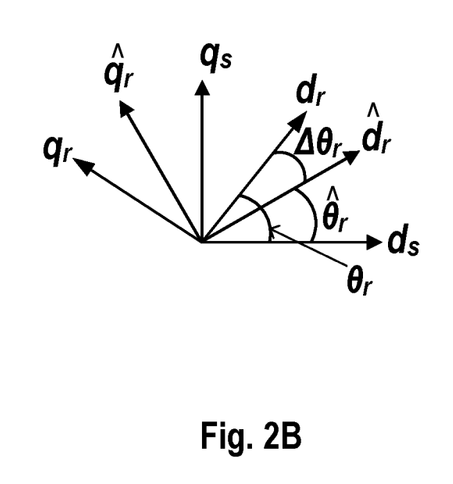
FIG. 2B shows exemplary stationary reference frame, actual rotor reference frame, and estimated rotor reference frame.

FIG. 2B illustrates exemplary reference frames. The d-q frame denoted by $d_s$ and $d_q$ indicates the stationary reference frame that is not rotating. The d-q frame denoted by dr and $q_r$ indicates the actual rotor reference frame, which rotors at the speed of the rotor. The d-q frame denoted by $\hat{d}_r$ and $\hat{q}_r$ indicates the estimated rotor reference frame. The actual position of the rotor can be represented by a rotational angle $\theta_r$ between the d-axes of the stationary reference frame and the actual rotor reference frame. Similarly, the estimated position of the rotor can be represented by another rotation angle $\hat{\theta}_r$. The different between $\theta_r$ and $\hat{\theta}_r$ is the estimation error $\Delta\theta_r$, which is the cause of the generation of the q-axis current response and can be driven to zero by an observer, such as a PID controller, thereby aligning the estimated rotor reference frame and the actual rotor reference frame.

Embodiments of the present application can inject a probing voltage signal into the motor system to generate a feedback response from the motor system. The voltage signal may be a pulsating sinusoidal voltage having a predetermined magnitude and a predetermined frequency. The voltage signal may be injected into the d-axis of the estimated rotor reference frame in low speed or zero speed condition. The position estimator may estimate the actual position of the rotor by reducing the estimation error, e.g., the difference between the estimated and actual rotor positions extracted from the response current in the q-axis of the estimated rotor reference frame. For example, based on the response, the position estimator can adjust the estimated rotor position $\hat{\theta}_r$, until the response indicates that the estimation error $\Delta\theta_r$ is substantially zero.

The detection of $\Delta\theta$ can be configured to be performed at various times, and can be based on an operation status of the vehicle (or the motor). For example, the detection can occur before the motor is started or within a relatively short time after starting. In another example, the detection of $\Delta\theta$ may be performed periodically according to a maintenance schedule. In another example, the detection of $\Delta\theta$ may be performed on demand. In another example, the detection of $\Delta\theta$ may be performed when a key to vehicle 100 disengages vehicle 100.

Figure 5:
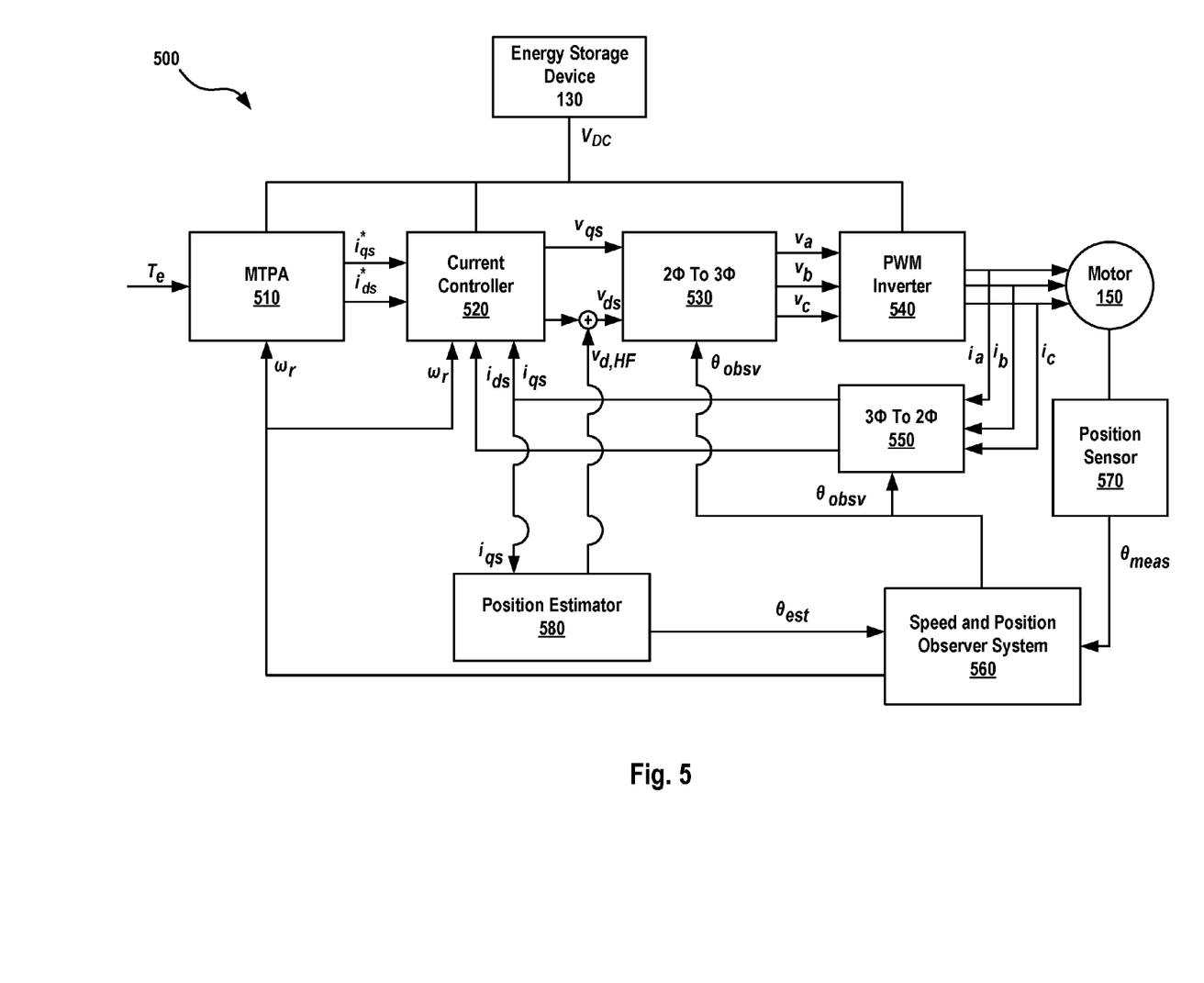
FIG. 5 is a block diagram of an exemplary embodiment of a motor control system.

FIG. 5 is a block diagram of an exemplary embodiment of a motor control system 500 for detecting rotor position measurement errors. Motor control system 300 may include a Maximum Torque Per Ampere (MTPA) module 510. MTPA module 510 may receive a torque command $T_e$ from, for example, vehicle control module 120, and generate corresponding d axis and q axis components of a current command ($i_{ds}^*$ and $i_{qs}^*$). For example, MTPA module 510 may include a look-up table storing mapping relations between, among other things, values of $T_e$ and values of $i_{ds}^*$ and $i_{qs}^*$ for a given rotational speed $\omega_r$. In some embodiments, during the process of detecting rotor position measurement errors, the current command $i_{ds}^*$ and $i_{qs}^*$ may be kept zero.

In regular motor control, the current command $i_{ds}^*$ and $i_{qs}^*$ may be input to a current regulator 520 as references. Current regulator may determine the difference between $i_{ds}^*$ and feedback current $i_{ds}$ and the difference between $i_{qs}^*$ and feedback current $i_{qs}$ to control a voltage command ($v_{ds}$ and $v_{qs}$). The voltage command in the d-q reference frame may be converted into actual phase voltages ($v_a$, $v_b$, and $v_c$), based on an output rotor position $\theta_{obsv}$, by a two-phase to three-phase transformer 530. The output rotor position $\theta_{obsv}$ can be provided by a speed and position observer system 560, the detail of which will be disclosed below. The actual phase voltages may be input to a PWM inverter 540 to drive motor 150. Phase currents ($i_a$, $i_b$, and $i_c$) may be measured and processed by a three-phase to two-phase transformer 550 to provide feedback currents ($i_{ds}$ and $i_{qs}$) in d-q reference frame to current regulator 520, again based on the output rotor position $\theta_{obsv}$.

As discussed above, speed and position observer system 560 may be used to provide output rotor position $\theta_{obsv}$. Speed and position observer system 560 may determine $\theta_{obsv}$ based on a measured rotor position $\theta_{meas}$ provided by a position sensor 570, which can sense a position of the rotor (e.g., a physical rotor position) within the motor and provide the information to speed and position observer system 560. The output rotor position $\theta_{meas}$ typically includes a position offset $\Delta\theta$ compared to the actual rotor position (e.g., the rotor flux position used in motor control). Speed and position observer system 560 may determine $\theta_{obsv}$ by compensating for at least a part of the position offset $\Delta\theta$ in $\theta_{meas}$. Speed and position observer system 560 may also determine the rotational speed $\omega_r$ based on at least one of $\theta_{meas}$ and $\theta_{obsv}$.

As shown in FIG. 5, motor control system 500 may include a position estimator 580 configured to inject a probing voltage signal into motor 150 to obtain a feedback response, and generate, based on the feedback response, an estimated rotor position $\theta_{est}$. Position estimator 580 can then provide the estimated rotor position $\theta_{est}$ to speed and position observer system 560. Speed and position observer system 560 can then compare $\theta_{est}$ against the measured rotor position $\theta_{meas}$ (provided by position sensor 570) to determine the position offset $\Delta\theta r$ and determine $\theta_{obsv}$ by compensating for at least a part of the position offset $\Delta\theta$ in $\theta_{meas}$. Although FIG. 5 illustrates position estimator 580 and speed and position observer system 560 as separate blocks, in some embodiments position estimator 580 can include speed and position observer system 560 as well.

Position estimator 580 may inject the probing voltage signal during a predetermined time period or when motor 150 is operating under a predetermined condition, to generate the feedback response signal. For example, the probing voltage signal may be injected when the rotor of motor 150 is in a stall position, during a startup process, or within a relative short period after the rotor of motor 150 starts to rotate (e.g., within 0.5 second, 1 second, 2 second, 5 second, etc.). In another example, the probing voltage signal may be injected when the rotational speed of the rotor is below a predetermined threshold (e.g., below 1%, 2%, 5%, or 10% of the base speed).

In some embodiments, the probing voltage signal can be in the form of a voltage signal, and can be added to the voltage command output of one of the axes of the d-q reference frame (e.g., $v_{ds}$ or $v_{qs}$) of current controller 520. For example, as shown in FIG. 5, a high frequency voltage signal is used as the probing voltage signal and is added to the d-axis voltage component. In some embodiment, the bandwidth of current controller 520 may be kept low such that current command or current feedback input to current controller 520 does not generate a corresponding voltage command. Therefore, the input signal to transformer 530 may contain the probing voltage signal alone, without $v_{ds}$ or $v_{qs}$. As discussed above, the d-q reference frame used to inject the probing voltage signal is an estimated reference frame, which may not align with the actual reference frame. As a result, the probing voltage signal, while in d-axis of the estimated reference frame, may contain both d- and q-axis components in the actual reference frame, which would generate a non-zero current response in the q axis of the estimated reference frame. The q-axis current response may be fed back from transformer 550, and received by position estimator 580. Although transformer 550 also feeds back current signals to current controller 520, in the processor of detecting rotor positions the bandwidth of current controller 520 may be kept low to prevent the feedback current from generating corresponding voltage command. Instead, the current response (e.g., $i_{qs}$) is used by position estimator 580 to extract the difference between the estimated and actual rotor position, and the drive the difference to substantially zero. After the difference is driven to substantially zero, the output of position estimator 580 $\theta_{est}$ may be deemed to be the same as or very close to the actual rotor position.

FIG. 5 shows a closed-loop system in which position estimator 580 updates the estimated rotor position $\theta_{est}$ according to the feedback current (e.g., $i_{qs}$) in response to the probing voltage signal $v_{d,HF}$ until the feedback current $i_{qs}$ is substantially close to zero. In this case, the estimated rotor position $\theta_{est}$ converges to the actual rotor position.

In some embodiments, each of MPTA 510, current controller 520, transformers 530 and 550, PWM inverter 540, speed and position observer system 560, and position estimator 580 may be implemented by one or more processor devices executing an algorithm and/or instructions stored in a memory device. In some embodiments, these components may be implemented by one or more circuits configured to perform functions such as signal application or injection, signal sampling, signal filtering, signal amplification or attenuation, logical operation, etc. In some embodiments, these components may be implemented by a combination of processor device(s) and circuit(s).

Figure 6:
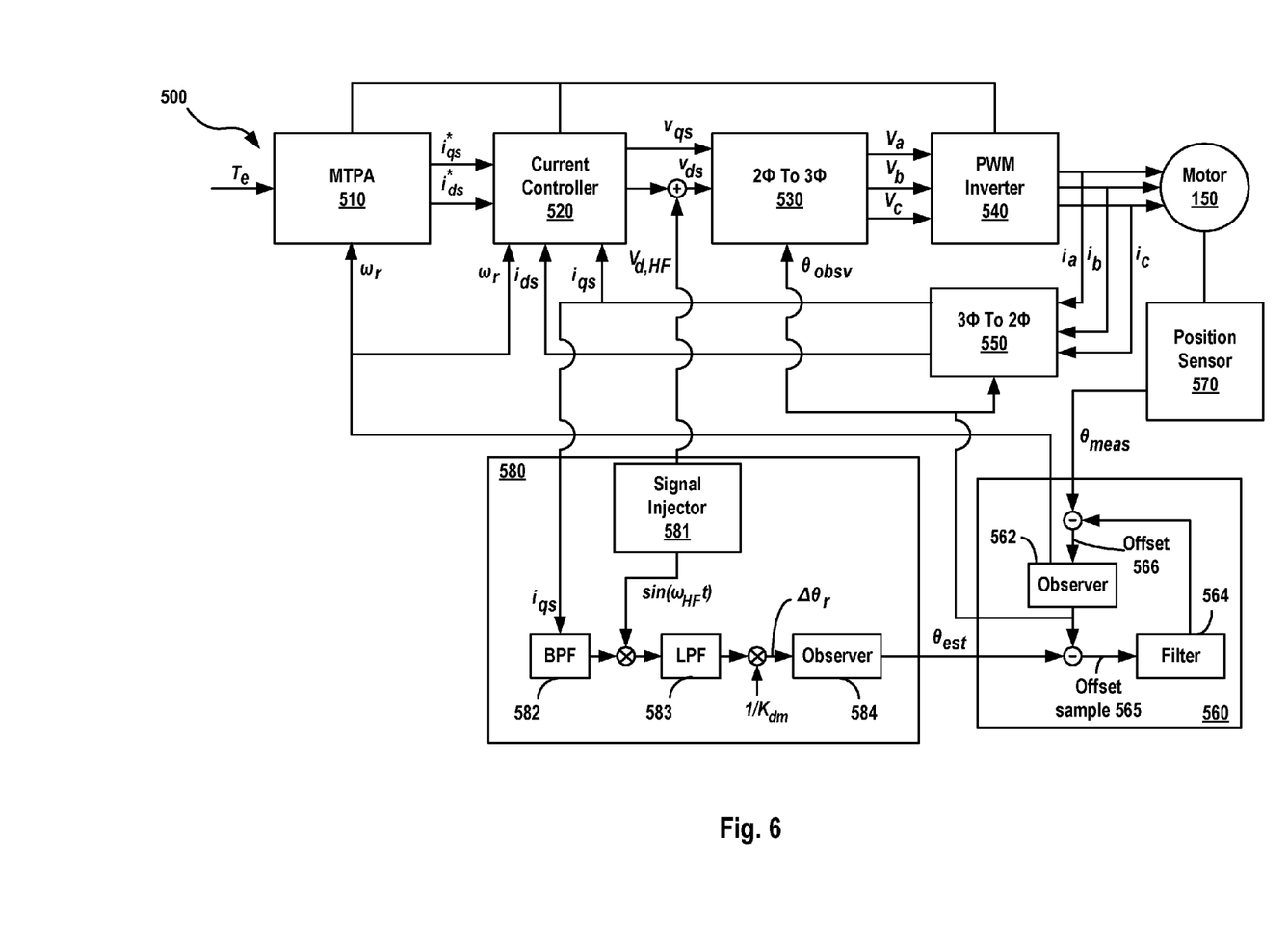
FIG. 6 is a block diagram of an exemplary embodiment of a motor control system including an exemplary implementation of a position estimator.

FIG. 6 provides further details of position estimator 580, and of speed and position observer system 560, to illustrate the operation of system 500. As discussed above, motor 150 may be a synchronous motor such as an IPM motor. In this implementation, the d-q reference frame is a synchronous frame. The stator equations of the IPM motor in the rotor reference frame are as follows:

$$\begin{bmatrix} v_{ds}^r \\ v_{qs}^r \end{bmatrix} = \tag{1}$$

-continued $$R_s \begin{bmatrix} i_{ds}^r \\ i_{qs}^r \end{bmatrix} + \begin{bmatrix} L_{ds} & 0 \\ 0 & L_{qs} \end{bmatrix} \frac{d}{dt} \begin{bmatrix} i_{ds}^r \\ i_{qs}^r \end{bmatrix} + \omega_r \begin{bmatrix} 0 & -L_{qs} \\ L_{ds} & 0 \end{bmatrix} \begin{bmatrix} i_{ds}^r \\ i_{qs}^r \end{bmatrix} + \omega_r \lambda_f \begin{bmatrix} 0 \\ 1 \end{bmatrix}$$

Here, $R_s$ is stator resistance, $\omega_r$ is the rotational speed of motor 150, while $i_{ds}^r$ and $i_{qs}^r$ are stator currents in the rotor reference frame. Further, $L_{ds}$, $L_{qs}$ are the inductances in the synchronous frame, while $\lambda_f$ is permanent magnet flux linkage. $v_{ds}^r$ and $v_{qs}^r$ can represent the voltage command provided to transformer 530, and may include the aforementioned probing voltage signal provided by position estimator 580. For example, in a case where position estimator generates a probing voltage signal $v_{d,HF}$ in the d-axis, $v_{ds}^r$ may equal to $v_{d,HF}$.

For a small rotational speed $\omega_r$, and that the probing voltage signal is at a high frequency (e.g., 300 Hz-1000 Hz), equation (1) can be simplified as follows:

$$\begin{bmatrix} v_{ds}^r \\ v_{qs}^r \end{bmatrix} = \begin{bmatrix} L_{ds} & 0 \\ 0 & L_{qs} \end{bmatrix} \frac{d}{dt} \begin{bmatrix} i_{ds}^r \\ i_{qs}^r \end{bmatrix} \quad (2)$$

The feedback currents, which represent the current responses to the $v_{ds}^r$ and $v_{qs}^r$, can be obtained based on the following equation:

$$\begin{bmatrix} i_{ds}^r \\ i_{qs}^r \end{bmatrix} = \int \begin{bmatrix} L_{ds} & 0 \\ 0 & L_{qs} \end{bmatrix}^{-1} \begin{bmatrix} v_{ds}^r \\ v_{qs}^r \end{bmatrix} dt = \frac{1}{L_{ds}L_{qs}} \begin{bmatrix} L_{ds} & 0 \\ 0 & L_{qs} \end{bmatrix} \int \begin{bmatrix} v_{ds}^r \\ v_{qs}^r \end{bmatrix} dt \quad (3)$$

The probing voltage signal can be in the form of a sinusoidal voltage signal and is injected in an estimated rotor frame, as follows:

$$V_{dqs,HF}^{\hat{r}} = \begin{bmatrix} v_{ds,HF}^{\hat{r}} \\ v_{qs,HF}^{\hat{r}} \end{bmatrix} = V_0 \begin{bmatrix} \cos(\omega_{HF}t) \\ 0 \end{bmatrix} \quad (4)$$

The probing voltage signal can be provided by a signal injector 581. If a difference exists between the actual rotor frame and the estimated rotor frame (e.g., there is an estimation error), which can be represented by $\Delta\theta_r$, a probing voltage signal in the d-axis can lead to feedback currents in both the d-axis and the q-axis in the estimated rotor frame. For example, the feedback currents in the actual rotor frame can be determined based on $V_{dqs,HF}^{\hat{r}}$, equation (3), and $\Delta\theta_r$ as follows:

$$I_{dqs}^r = \frac{V_0}{\omega_{HF}} \begin{bmatrix} \frac{\cos(\Delta\theta_r)}{L_{ds}}\cos(\omega_{HF}t) - \\ \frac{\sin(\Delta\theta_r)}{L_{qs}}\cos(\omega_{HF}t) \end{bmatrix} \quad (5)$$

The currents in the estimated rotor frame can be calculated based on equation (5) and an inverse rotation matrix, as follows:

$$I_{dqs}^{\hat{r}} = \frac{V_0}{\omega_{HF}} \begin{bmatrix} \left(\frac{\cos^2(\Delta\theta_r)}{L_{ds}} + \frac{\sin^2(\Delta\theta_r)}{L_{qs}}\right)\sin(\omega_{HF}t) \\ \frac{1}{2}\frac{L_{qs} - L_{ds}}{L_{ds}L_{qs}}\sin(2\Delta\theta_r)\sin(\omega_{HF}t) \end{bmatrix} \quad (6)$$

The q-axis feedback current $i_{qs}^{\hat{r}}$ in the estimated rotor frame, which can be represented by the expression $$\frac{1}{2}\frac{L_{qs} - L_{ds}}{L_{ds}L_{qs}}\sin(2\Delta\theta_r)\sin(\omega_{HF}t),$$

can be further processed to deduce the position estimation error $\Delta\theta_r$. For example, as shown in FIG. 6, $I_{qs}^{\hat{r}}$ can be first processed by a bandpass filter (BPF) 582 to remove components related to the operation of the IPM at low speed. The bandpassed $i_{qs}^{\hat{r}}$ can then be demodulated, in which the bandpassed $i_{qs}^{\hat{r}}$ can be multiplied by a sinusoidal signal $\sin(\omega_{HF}t)$ (which can be provided by signal injector 581), and low-passed by a lowpass filter (LPF) 583 to remove the high frequency components resulted from the multiplication (e.g., the 2 $\omega_{HF}$ component). The output of the LPF may be represented by the following equation, for a small position estimation error $\Delta\theta_r = \theta_r - \hat{\theta}_r$:

$$\varepsilon_{HF} = \frac{1}{4}\frac{V_0}{\omega_{HF}}\frac{L_{qs} - L_{ds}}{L_{ds}L_{qs}}\sin(2\Delta\theta_r) \approx \frac{1}{2}\frac{V_0}{\omega_{HF}}\frac{L_{qs} - L_{ds}}{L_{ds}L_{qs}}\Delta\theta_r \quad (7)$$

The output $\varepsilon_{HF}$ can then be scaled by a factor $K_{dm}$, which equals to $$\frac{1}{2}\frac{V_0}{\omega_{HF}}\frac{L_{qs} - L_{ds}}{L_{ds}L_{qs}},$$

to obtain the position estimation error $\Delta\theta_r$. In some embodiments, $K_{dm}$ can be determined experimentally. For example, a probing voltage signal of known $V_0$ and $\omega_{HF}$ can be used to obtain different values of $\varepsilon_{HF}$ while sweeping the estimated rotor position $\hat{\theta}_r$. Because $\varepsilon_{HF}$ is a sinusoidal function of $\Delta\theta_r$, sweeping $\hat{\theta}_r$ is equivalent to sweeping $\Delta\theta_r$. After at least a half cycle of the sinusoidal function is obtained, the maximum value of $\varepsilon_{HF}$ within the at least half cycle may be used to as $K_{dm}$.

The above operations can be performed by any combination of algorithms and circuits for digital signal processing.

Figure 7:
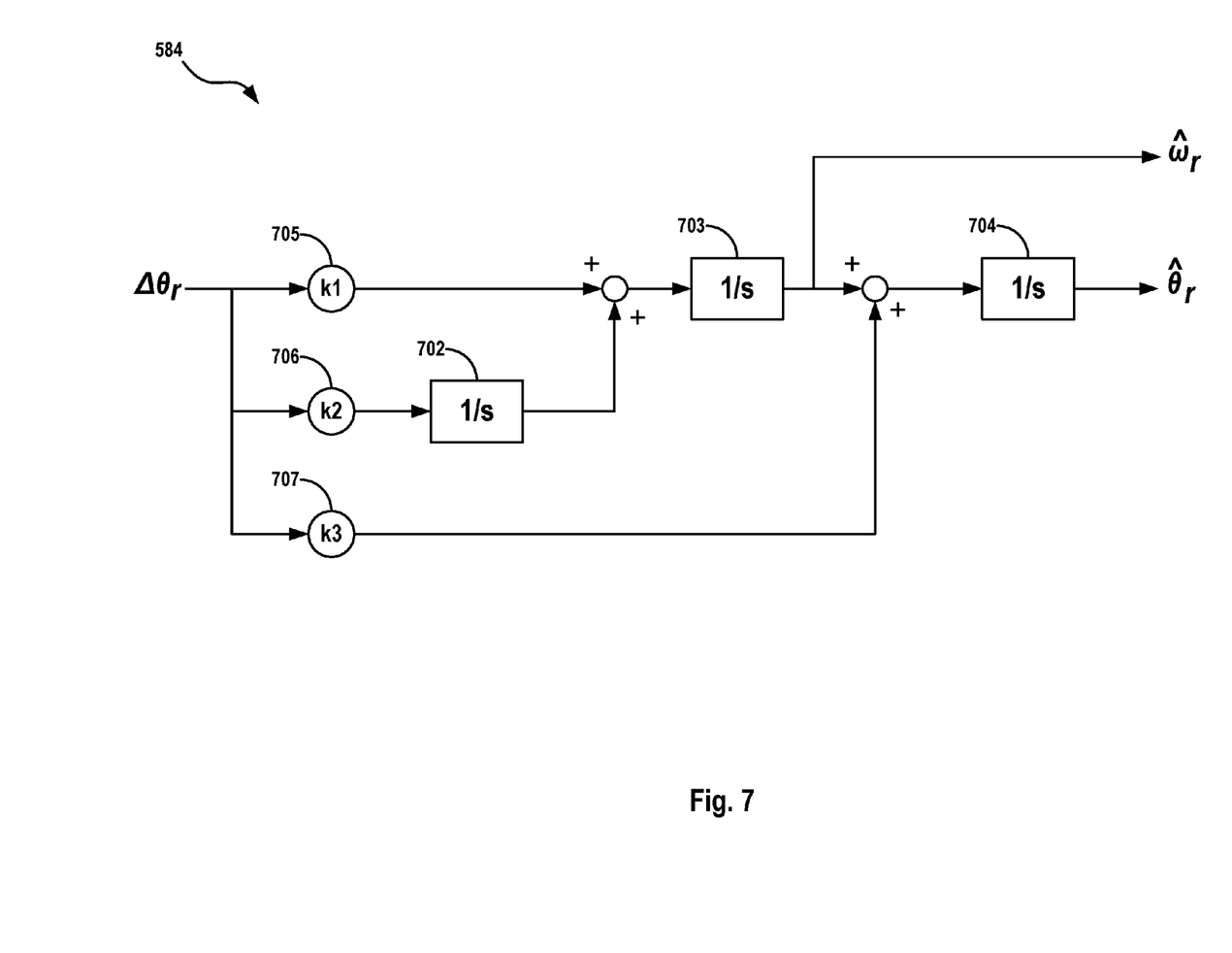
FIG. 7 is a block diagram of an exemplary embodiment of an observer.

The generated $\Delta\theta_r$ can then be provided to an observer 584, which, by adjusting the estimated rotor position $\hat{\theta}_r$ based on $\Delta\theta_r$, drives $\Delta\theta_r$ to substantially zero. Reference is now made to FIG. 7, which illustrates the components of an exemplary embodiment of observer 584. As shown in FIG. 7, observer 584 includes a plurality of integrators 702, 703, and 704, as well as a plurality of gain stages 705, 706, and 707. Gain stage 707 ("k3" as indicated in FIG. 7) can provide a signal path that act as a differentiator relative to, for example, gate stages 705 ("k1") and 706 ("k2").

Referring back to FIG. 6, the estimated rotor position $\theta_{est}$ ($\hat{\theta}_r$ in FIG. 7) can then be provided to speed and position observer system 560, which also includes an observer system 562 to generate the output rotor position $\theta_{obsv}$ and the motor rotational speed $\omega_r$. In some embodiments, a filter 564 may also be provided. In some embodiments, observer system 562 may include a similar structure as observer 584 but with different configurations (e.g., different values for the gain stages k1, k2, and k3). Speed and position observer system 560 can generate an offset sample 565 between the estimated rotor position $\theta_{est}$ and a current output rotor position $\theta_{obsv}$. The offset sample 565 can be filtered by filter 564 (if provided) to generate a filtered offset 566. As discussed above, if the samples of angular offsets collected correspond to a set of substantially uniformly-distributed rotor positions, the actual angular offset can be estimated based on, for example, an average of the offset samples. Here, filter 564 can be configured to provide the averaging function. In some embodiments, filter 564 can be configured to accept a predetermined number of offset samples 565 within a predetermined period of time and determine an average, and then accept new offset samples (and update the average) after the predetermined period of time elapses. In some embodiments, filter 564 can be configured to generate a moving average of offset samples 565, in which case a predetermined number of most recent offset samples are used to generate offset 566.

In some embodiments, filter 564 is optional or bypassed. For example, the offset samples can be filtered to provide a result for measurement and testing, while the unfiltered offset samples can be provided directly to the transformers 530 and 550, to avoid additional delay caused by filter 564.

Speed and position observer system 560 can then generate output rotor position $\theta_{obsv}$ by compensating the measured rotor position $\theta_{meas}$ with offset 566, and provide $\theta_{obsv}$ to transformers 530 and 550, which then perform three-phase to/from reference frame transformation based on $\theta_{obsv}$. The position estimator 580 can adjust the estimated rotor position until the estimation error $\Delta\theta_r$ is substantially close to zero, which can be indicated when the feedback current $i_{qs}$ is substantially close to zero. In this case, the estimated rotor position $\theta_{est}$ converges to the actual rotor position, and the output rotor position $\theta_{obsv}$, which is used for performing three-phase to/from reference frame transformation, has substantially zero offset. In other words, the offset $\Delta\theta$ between the measured rotor position and the actual rotor position can be compensated and accounted for. The actual rotor offset thus determined can then be stored in a memory, and can be provided to the system (e.g., transformers 530 and 550) for future determination of rotor position without having position estimator 580 to inject the probing voltage signal.

Figure 8:
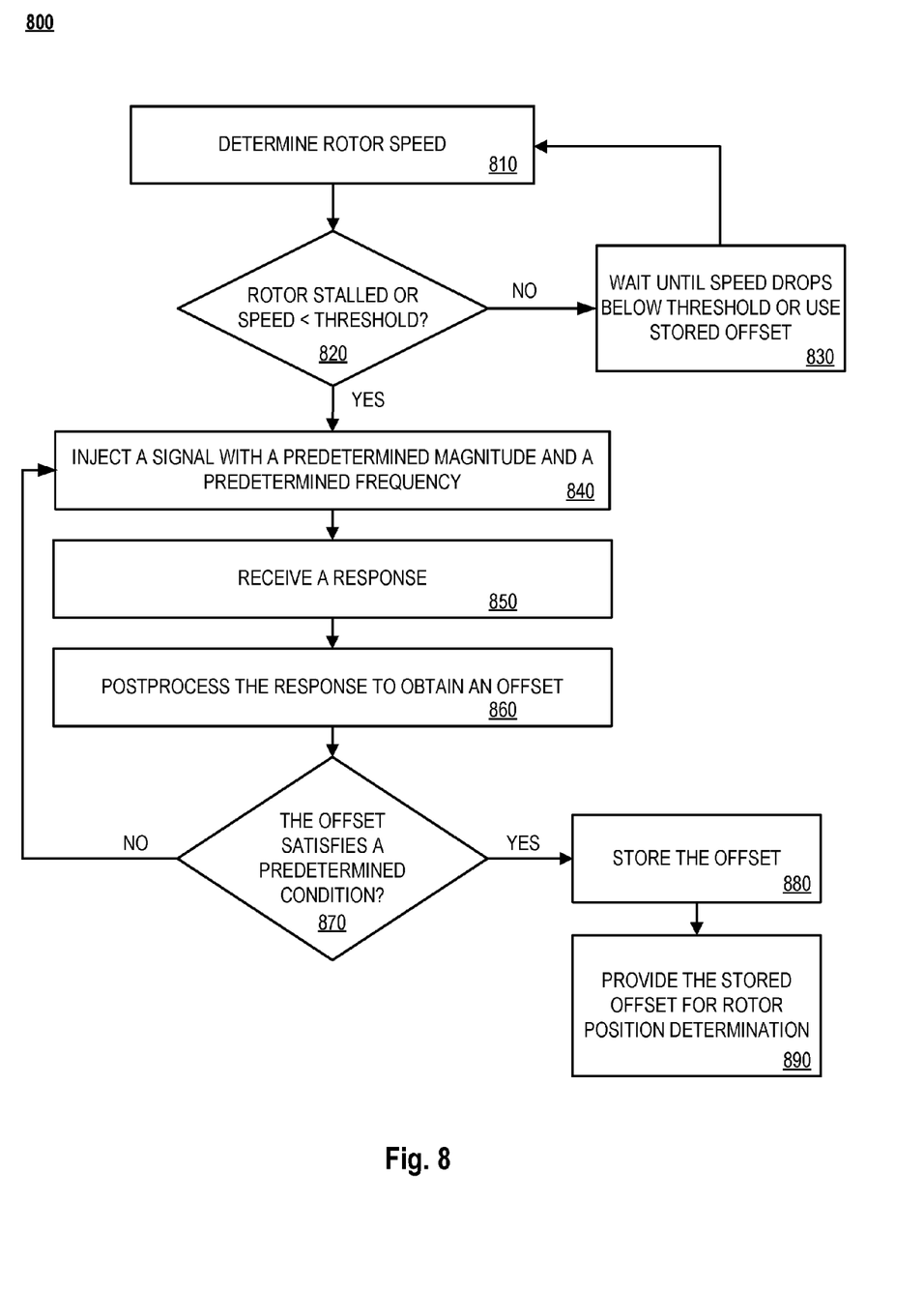
FIG. 8 is a flow chart illustrating an exemplary method for detecting rotor position errors.

FIG. 8 is a flowchart depicting a method 800 for detecting and eliminating rotor position measurement errors, according to an embodiment of this disclosure. Method 800 includes a plurality of steps, some of which may be omitted. Method 800 may be carried out by a processor device of a motor control system (e.g., motor control system 140) executing an algorithm and/or instructions, by dedicated circuitries configured to perform one or more specific functions, or by a combination thereof.

In step 810, motor control system 140 may determine the speed of the rotor. For example, the speed may be determined using a position sensor or a speed sensor. When the motor is stalled, the speed of the rotor is zero.

In step 820, motor control system 140 may determine whether the speed of the rotor is zero (stalled) or is not zero but below a predetermined threshold (e.g., below 1%, 2%, 5%, or 10% of the normal operating speed). If speed is not below the threshold (step 820: no), motor control system 140 may wait until the speed is below the threshold or use a stored offset to control the motor (step 830). If the speed is below the threshold (step 820: yes), method 800 may proceed to step 840.

In step 840, after motor control system 140 determines that the rotor is either stalled or has a relatively low speed in relation to the predetermined threshold, motor control system 140 may start the position measurement error detection process to detect an offset between a measured position and an actual position of the rotor. In step 840, signal injector 581 of position estimator 580 may inject a probing voltage signal, such as a voltage signal with a predetermined magnitude and frequency in the d-axis of an estimated rotor reference frame.

In step 850, position estimator 580 receives a response (e.g., in the form of feedback current) in the estimated rotor reference frame (e.g., $i_{qs}$). Position estimator 580 then adjust the estimated rotor position based on the response and provide the adjusted rotor position estimation to speed and position observer system 560, in step 860. The adjusting of the estimated rotor position may include multiplying the received response with a signal of the same frequency as the probing voltage signal to generate a product, filtering the product with a low pass filter, and scaling the filtered product to obtain an estimation error. The estimation error is then input to an observer (e.g., 584) to adjust the estimated rotor position. The estimated rotor position is adjusted aiming to reduce the estimation error. The adjusted rotor position estimation is then used to compared with the measured rotor position to generate an offset sample, the offset sample can also be combined with other previously-determined offset samples based on an averaging function, to generate an estimated offset.

In step 870, the system may determine whether the estimated offset satisfy a predetermined condition. For example, the estimated offset can be compared to a factory calibration and if it is off by a certain percentage, the estimated offset can be discarded. If the estimated offset satisfies the predetermined condition (i.e., step 870 provides a "yes"), the system can then proceed to step 880 and store the estimated offset, and then to step 890 and provide the estimated offset for future rotor position estimation (e.g., for step 830). If the system determines that the estimated offset does not satisfy the predetermined condition (step 870 provides a "no"), method 800 may return to step 840 to continue injecting the probing voltage signal. In some embodiments, the predetermined condition may include convergence of the estimation error demodulated from the response current in step 860. In some embodiments, the predetermined condition may include substantially zero current response in the estimated rotor reference frame. In some embodiments, the predetermined condition may include convergence of the estimated offset.

The embodiments disclosed above include systems and methods for detecting position measurement errors in electric motors. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed embodiments are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be used in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples of computer-readable media include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A system for controlling an electric motor, the system comprising:
   a position sensor configured to measure a physical position of a rotor of the electric motor; and
   a position estimator configured to:
      inject a voltage signal having a predetermined frequency into the electric motor,
      generate an estimated position of a rotor flux based on a feedback current signal in response to the injected voltage signal, and
      compensate for an offset between the physical position measured by the position sensor and an actual position of the rotor flux based on the estimated position.

2. The system of claim 1, wherein the position estimator is configured to:
   inject the voltage signal in a rotating reference frame based on the estimated position of the rotor flux;
   demodulate the feedback current signal;
   filter the demodulated feedback current signal;
   apply a gain factor to the demodulated and filtered feedback current signal to generate an estimation error; and
   generate the estimated position of the rotor flux based on the estimation error.

3. The system of claim 2, wherein the voltage signal is injected along the d-axis of the rotating reference frame.

4. The system of claim 1, wherein the predetermined frequency is in a range between 300 Hz and 1000 Hz.

5. The system of claim 2, wherein the position estimator is configured to:
   determine an offset sample based on the estimated position of the rotor flux and the physical position of the rotor measured by the position sensor; and
   combine the offset sample with one or more previously-determined offset samples to determine an estimated offset.

6. The system of claim 1, wherein the position estimator is configured to inject the voltage signal when the rotor of the electric motor is in a stall position.

7. The system of claim 1, wherein the position estimator is configured to inject the voltage signal when a speed of the rotor of the electric motor is below a predetermined threshold.

8. The system of claim 2, wherein the position estimator is configured to adjust the estimated position of the rotor flux to reduce the estimation error.

9. A method for detecting position measurement errors for an electric motor, the method comprising:
   measuring, by a position sensor, a physical position of a rotor of the electric motor;
   injecting, by a position estimator, a voltage signal having a predetermined frequency into the electric motor;
   generating, by the position estimator, an estimated position of a rotor flux based on a feedback current signal in response to the injected voltage signal; and
   compensate for an offset between the physical position measured by the position sensor and an actual position of the rotor flux based on the estimated position.

10. The method of claim 9, further comprising:
    injecting the voltage signal in a rotating reference frame based on the estimated position of the rotor flux;
    demodulating the feedback current signal;
    filtering the demodulated feedback current signal;
    applying a gain factor to the modulated and filtered feedback current signal to generate an estimation error; and
    generating the estimated position of the rotor flux based on the estimation error.

11. The method of claim 10, wherein injecting the voltage signal further comprises:
    injecting the voltage signal along the d-axis of the rotating reference frame.

12. The method of claim 9, wherein the predetermined frequency in a range between 300 Hz and 1000 Hz.

13. The method of claim 10, further comprising:
    determining an offset sample based on the estimated position of the rotor flux and the physical position of the rotor measured by the position sensor; and
    combining the offset sample with one or more previously-determined offset samples to determine an estimated offset.

14. The method of claim 9, further comprising:
    injecting the voltage signal when the rotor of the electric motor is in a stall position.

15. The method of claim 9, further comprising:
    injecting the voltage signal when a speed of the rotor of the electric motor is below a predetermined threshold.

16. The method of claim 10, further comprising:
    adjusting the estimated position of the rotor flux to reduce the estimation error.

17. A motor system, comprising:
    an electric motor including a rotor and a stator;
    a motor control system configured to control the electric motor, the motor control system including:

a position sensor configured to measure a physical position of the rotor of the electric motor; and a position estimator configured to:
  inject a voltage signal having a predetermined frequency into the electric motor,
  generate an estimated position of a rotor flux based on a feedback current signal in response to the injected voltage signal, and
  compensate for an offset between the physical position measured by the position sensor and an actual position of the rotor flux based on the estimated position.

18. The motor system of claim 17, wherein the electric motor includes a synchronous electric motor.

19. The motor system of claim 18, wherein the electric motor includes an interior permanent magnet (IPM) motor.

20. A chassis for a vehicle, the chassis comprising:
  a propulsion system for providing motive torques to at least one wheel of the vehicle, the propulsion system comprising:
    an energy storage device configured to store electric energy;
    an electric motor including a rotor and a stator;
    a motor control system configured to control energy transfer between the energy storage device and the electric motor, the motor control system including:
      a position sensor configured to measure a physical position of the rotor of the electric motor; and
      a position estimator configured to:
        inject a voltage signal having a predetermined frequency into the electric motor,
        generate an estimated position of a rotor flux based on a feedback current signal in response to the injected voltage signal, and
        compensate for an offset between the physical position measured by the position sensor and an actual position of the rotor flux based on the estimated position.

* * * * *